United States Patent
Huang et al.

(10) Patent No.: US 10,616,248 B2
(45) Date of Patent: Apr. 7, 2020

(54) SPACE AND TIME EFFICIENT THREAT DETECTION

(71) Applicant: Anomali Inc., Redwood City, CA (US)

(72) Inventors: Wei Huang, Los Altos Hills, CA (US); Yizheng Zhou, Cupertino, CA (US); Hugh Njemanze, Redwood City, CA (US)

(73) Assignee: Anomali Incorporated, Redwood City, CA (US)

( * ) Notice: Subject to any disclaimer, the term of this patent is extended or adjusted under 35 U.S.C. 154(b) by 0 days.

(21) Appl. No.: 16/255,708

(22) Filed: Jan. 23, 2019

(65) Prior Publication Data

US 2019/0158514 A1 May 23, 2019

Related U.S. Application Data (63) Continuation of application No. 15/007,131, filed on Jan. 26, 2016, now Pat. No. 10,230,742.
(Continued)

(51) Int. Cl.
*H04L 29/06* (2006.01)
*G06F 21/62* (2013.01)
(Continued)

(52) U.S. Cl.
CPC ........ *H04L 63/1416* (2013.01); *G06F 21/552* (2013.01); *G06F 21/6254* (2013.01); *G06N 20/00* (2019.01); *H04L 63/1433* (2013.01)

(58) Field of Classification Search
CPC ............ H04L 63/1416; H04L 63/1433; G06F 21/6254; G06N 99/005
See application file for complete search history.

(56) References Cited

U.S. PATENT DOCUMENTS

| 7,594,270 B2 | 9/2009 | Church et al. |
| 8,095,964 B1 | 1/2012 | Zhong et al. |
| (Continued) | | |

FOREIGN PATENT DOCUMENTS

| CN | 102571812 A | 7/2012 |
| CN | 103999091 A | 8/2014 |
| (Continued) | | |

OTHER PUBLICATIONS

European Extended Search Report, European Application No. 16744048.6, dated Aug. 7, 2018, 9 pages.
(Continued)

*Primary Examiner* — J. Brant Murphy
*Assistant Examiner* — Stephen T Gundry
(74) *Attorney, Agent, or Firm* — Fenwick & West LLP (57) ABSTRACT

A security monitoring system operated by a downstream client continually collects event information indicating events that have occurred within the computing environment of the downstream client. The monitoring system, using software provided by a threat analytics system, aggregates the event information into a secure and space efficient data structure. The monitoring system transmits the data structures storing event information to the threat analytics system for further processing. The threat analytics system also receives threat indicators from intelligence feed data sources. The threat analytics system compares the event information received from each security monitoring system against the threat indicators collected from the intelligence feed data sources to identify red flag events. The threat analytics system processes the event information to synthesize all information related to the red flag event and reports the red flag event to the downstream client.

20 Claims, 9 Drawing Sheets

Related U.S. Application Data (60) Provisional application No. 62/109,862, filed on Jan. 30, 2015.

(51) Int. Cl.
*G06F 21/55* (2013.01)
*G06N 20/00* (2019.01)

(56) References Cited

U.S. PATENT DOCUMENTS

| | | | |
|---|---|---|---|
| 8,239,668 B1* | 8/2012 | Chen | H04L 63/1408 706/45 |
| 8,286,239 B1 | 10/2012 | Sutton | |
| 8,332,947 B1 | 12/2012 | Bregman et al. | |
| 8,631,330 B1 | 1/2014 | Hwang et al. | |
| 9,306,965 B1* | 4/2016 | Grossman | H04L 63/1416 |
| 9,336,385 B1 | 5/2016 | Spencer et al. | |
| 9,378,361 B1 | 6/2016 | Yen et al. | |
| 9,392,003 B2* | 7/2016 | Amsler | H04L 63/20 |
| 9,392,007 B2* | 7/2016 | Giokas | H04L 63/1416 |
| 9,596,266 B1 | 3/2017 | Coleman et al. | |
| 9,648,037 B2 | 5/2017 | Merza | |
| 9,686,293 B2 | 6/2017 | Golshan et al. | |
| 9,692,789 B2* | 6/2017 | Kirti | H04L 63/20 |
| 9,710,644 B2 | 7/2017 | Reybok et al. | |
| 9,740,940 B2 | 8/2017 | Chattopadhyay et al. | |
| 2004/0044912 A1 | 3/2004 | Connary et al. | |
| 2005/0193429 A1 | 9/2005 | Demopoulos et al. | |
| 2007/0169194 A1* | 7/2007 | Church | G06F 21/552 726/23 |
| 2007/0209074 A1 | 9/2007 | Coffman | |
| 2007/0226796 A1 | 9/2007 | Gilbert et al. | |
| 2008/0047009 A1 | 2/2008 | Overcash et al. | |
| 2008/0148398 A1 | 6/2008 | Mezack et al. | |
| 2008/0271143 A1 | 10/2008 | Stephens et al. | |
| 2009/0328209 A1* | 12/2009 | Nachenberg | G06Q 10/10 726/22 |
| 2010/0263049 A1 | 10/2010 | Cross et al. | |
| 2010/0275263 A1 | 10/2010 | Bennett et al. | |
| 2010/0281542 A1 | 11/2010 | Stolfo et al. | |
| 2011/0047620 A1* | 2/2011 | Mahaffey | G06F 21/564 726/23 |
| 2011/0161848 A1* | 6/2011 | Purcell | G06F 21/554 715/764 |
| 2012/0072983 A1 | 3/2012 | McCusker et al. | |
| 2012/0096549 A1 | 4/2012 | Amini et al. | |
| 2012/0210434 A1* | 8/2012 | Curtis | G06F 21/577 726/25 |
| 2012/0224057 A1 | 9/2012 | Gill et al. | |
| 2013/0074143 A1 | 3/2013 | Bu et al. | |
| 2013/0139268 A1 | 5/2013 | An et al. | |
| 2013/0139269 A1 | 5/2013 | Shaikh et al. | |
| 2013/0174259 A1* | 7/2013 | Pearcy | H04L 41/0893 726/25 |
| 2013/0174260 A1 | 7/2013 | Amit et al. | |
| 2014/0013432 A1 | 1/2014 | Yi | |
| 2014/0223555 A1 | 8/2014 | Sanz Hernando et al. | |
| 2014/0259170 A1 | 9/2014 | Connary et al. | |
| 2014/0289853 A1* | 9/2014 | Teddy | H04L 63/1416 726/23 |
| 2014/0331322 A1* | 11/2014 | Jaroch | H04L 63/1416 726/23 |
| 2014/0337974 A1 | 11/2014 | Joshi et al. | |
| 2014/0373162 A1 | 12/2014 | Mahaffey et al. | |
| 2015/0128274 A1 | 5/2015 | Giokas | |
| 2015/0163242 A1* | 6/2015 | Laidlaw | G06F 21/552 726/22 |
| 2015/0172321 A1* | 6/2015 | Kirti | H04L 63/20 726/1 |
| 2015/0244732 A1 | 8/2015 | Golshan et al. | |
| 2015/0373039 A1 | 12/2015 | Wang | |
| 2015/0373043 A1 | 12/2015 | Wang et al. | |
| 2016/0164893 A1* | 6/2016 | Levi | H04L 63/1416 726/23 |
| 2016/0191549 A1* | 6/2016 | Nguyen | H04L 63/1425 726/23 |
| 2016/0191558 A1* | 6/2016 | Davison | H04L 63/145 713/171 |
| 2016/0203336 A1* | 7/2016 | Nambiar | G06F 21/6254 726/26 |
| 2016/0212165 A1* | 7/2016 | Singla | G06F 21/577 |
| 2016/0234167 A1* | 8/2016 | Engel | H04L 63/1408 |
| 2016/0248800 A1* | 8/2016 | Ng | H04L 63/20 |
| 2016/0248805 A1* | 8/2016 | Burns | H04L 63/1433 |
| 2016/0269434 A1 | 9/2016 | DiValentin et al. | |
| 2016/0292455 A1* | 10/2016 | Jebara | G06F 21/6245 |
| 2016/0378978 A1* | 12/2016 | Singla | G06F 21/55 726/23 |
| 2017/0026391 A1* | 1/2017 | Abu-Nimeh | G06F 16/285 |
| 2017/0054738 A1* | 2/2017 | Avidan | G06F 21/566 |
| 2017/0091972 A1* | 3/2017 | Pearcy | H04L 41/0893 |
| 2017/0111396 A1* | 4/2017 | Chesla | H04L 63/02 |
| 2017/0142143 A1 | 5/2017 | Seward et al. | |
| 2017/0142147 A1 | 5/2017 | Singla et al. | |
| 2017/0142149 A1* | 5/2017 | Coates | H04L 63/1416 |
| 2017/0155683 A1 | 6/2017 | Singla | |
| 2017/0169252 A1* | 6/2017 | Ukena-Bonfig | H04W 8/16 |
| 2017/0169360 A1* | 6/2017 | Veeramachaneni | G06F 21/56 |
| 2017/0206557 A1 | 7/2017 | Abrol et al. | |
| 2017/0214711 A1 | 7/2017 | Arnell et al. | |
| 2017/0220801 A1 | 8/2017 | Stockdale et al. | |
| 2017/0346839 A1* | 11/2017 | Peppe | G06F 21/577 |
| 2019/0132358 A1* | 5/2019 | DiValentin | H04L 63/1491 |

FOREIGN PATENT DOCUMENTS

| | | |
|---|---|---|
| JP | 2011-527046 A | 10/2011 |
| WO | WO 2014/082749 A1 | 6/2014 |

OTHER PUBLICATIONS

International Search Report and Written Opinion, PCT Application No. PCT/US2016/015167, dated Mar. 31, 2016, 17 pages.
United States Office Action, U.S. Appl. No. 15/007,131, dated Jun. 6, 2018, 20 pages.
United States Office Action, U.S. Appl. No. 15/007,131, dated Sep. 8, 2017, 20 pages.
Canadian Intellectual Property Office, Office Action, Canadian Patent Application No. 2,974,708, dated Jun. 18, 2019, 7 pages.
Japanese Office Action, Japan Patent Office Application No. 2017-558628, dated Nov. 19, 2019, 10 pages.
First Office Action, Chinese Patent Application No. 201680015075.4, dated Feb. 3, 2020, 22 pages.

\* cited by examiner

SPACE AND TIME EFFICIENT THREAT DETECTION

CROSS REFERENCE TO RELATED APPLICATIONS

This application claims a benefit of and priority to U.S. application Ser. No. 15/007,131, filed Jan. 26, 2106, which claims priority to Provisional Application Ser. No. 62/109,862, filed on Jan. 30, 2015, which is incorporated herein by reference in its entirety.

BACKGROUND

Field of Art

The disclosure generally relates to the field of cyber-threat detection.

Description of Art

Cyber-threat detection is an integral part of the security infrastructure of an online system. A key part of a typical threat detection system is threat intelligence feeds—feeds that indicate entities that are associated with suspicious behaviors. Information from the threat intelligence feeds is then compared against event information collected from the online system to determine whether any of the events may be associated with cyber-threats. In some cases, the threat intelligence feeds may include information that causes events that are otherwise harmless to incorrectly be flagged as cyber-threats. This imposes an unnecessary investigatory burden on the operators of the online system because of the false positives or false negatives stemming from incorrect information.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates a computing environment configured for threat detection.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a threat analytics system that intelligently processes event information received from downstream client systems to identify red flag events, i.e., events that are indicative of a cyber-threat. In operation, a security monitoring system operated by a downstream client continually collects event information indicating events that have occurred within the computing environment of the downstream client. Each event specifies an entity identifier that is associated with the event, such as an internet protocol (IP) address, file hash, domain, email address, and other types of information associated with an incoming request. The monitoring system, using software provided by the threat analytics system, aggregates the event information into a secure and space efficient data structure. The event information may be aggregated according to different time windows, such that one data structure may include event information aggregated across a month and another data structure may include event information aggregated across an hour. The monitoring system transmits the data structures storing aggregated event information to the threat analytics system for further processing. In alternate embodiments, the event information is transmitted to the threat analytics system is as single events without being aggregated.

The threat analytics system also receives threat indicators from intelligence feed data sources. These threat indicators include entity identifiers, such as IP addresses, domain names, and uniform resource locators (URLs), that have been identified by the intelligence feed data sources as potential threats. The threat analytics system compares the event information received from each security monitoring system against the threat indicators collected from the intelligence feed data sources. When a threat indicator matches an entity identifier included in the event information, the threat analytics system determines the validity of the threat indicator. If the threat indicator is determined to be a valid threat, then the event associated with the entity identifier is deemed as a red flag event. The threat analytics system processes the event information to synthesize all information related to the red flag event and reports the red flag event to the downstream client.

Example Computing Environment Architecture

Figure 1:
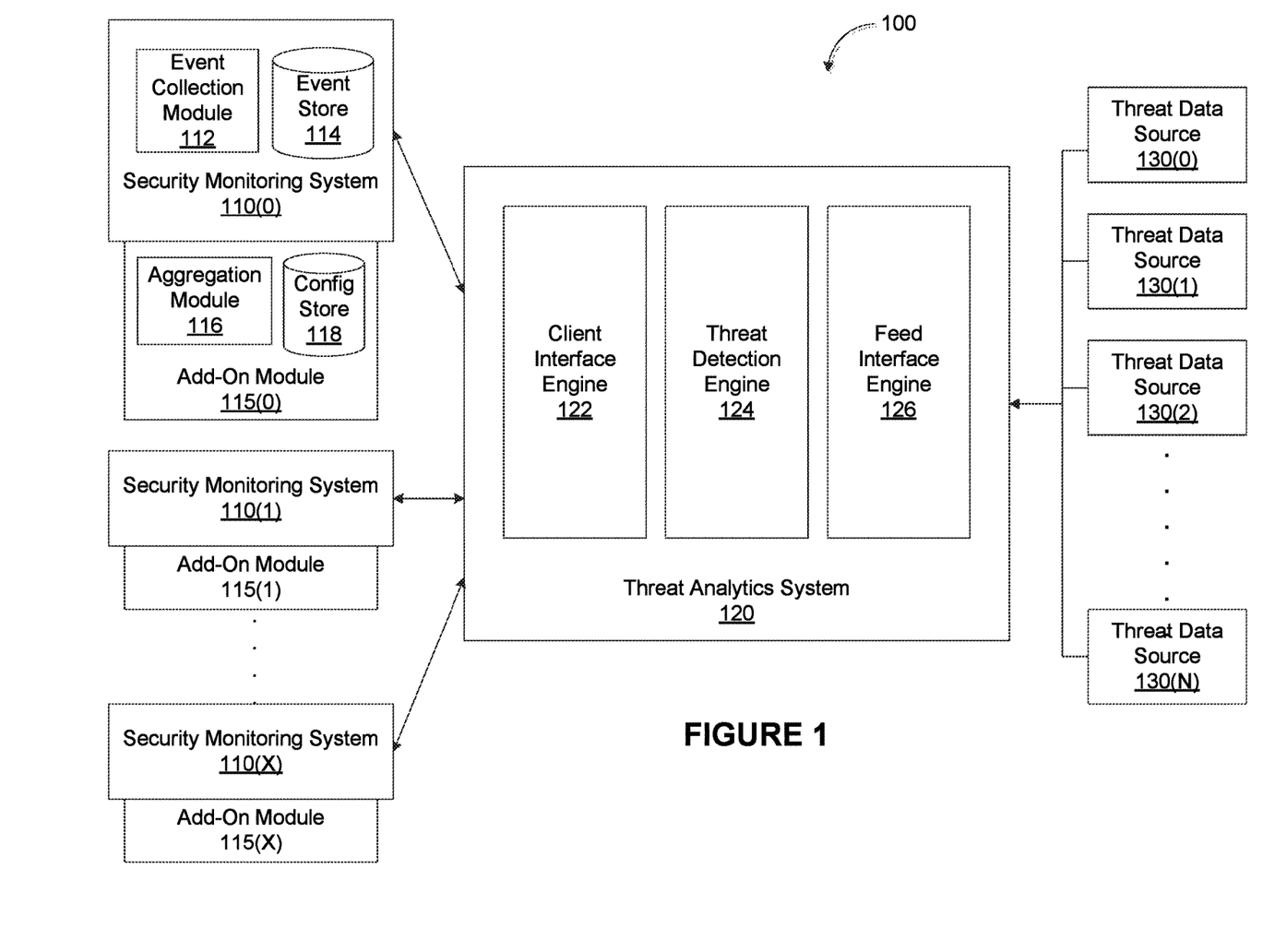

FIG. 1 illustrates a computing environment 100 configured for threat detection according to an embodiment. As shown, the computing environment 100 includes security monitoring systems 110(0)-110(N) (collectively, security monitoring systems 110, and, individually, security monitoring system 110), a threat analytics system 120, and threat data sources 130(0)-130(N) (collectively, threat data sources 130, and, individually, threat data source 130). Each of the security monitoring systems 110(0)-110(N) is coupled to one of the add-on modules 115(0)-115(N) (collectively, add-on modules 115, and, individually, add-on module 115).

A security monitoring system 110 includes an event collection module 112 and an event store 114. In one embodiment, the security monitoring system 110 may be security information and event management (STEM) system. The event collection module 112 connects to various services within the computing infrastructure of a client system to continually collect event information from those services. Such services include network devices, security systems, servers, databases, and software applications. Each event is associated with at least a timestamp and an entity identifier to which the event can be attributed. An entity identifier may be an IP address, a domain name, a username, a MAC address, an email address, a file hash, or any other technically feasible unique identifier. The attribution of an event to an entity identifier may be an affirmative attribution or an inferred attribution. The event collection module 112 stores collected event information in the event store 114.

The add-on module 115 coupled to the security monitoring system 110 is a software module provided by the threat analytics system 120 to the security monitoring system 110 for the purposes of aggregating event information. The add-on module 115 includes an event aggregation module 116 (or, alternatively, aggregation module 116) and a configuration store 118. The event aggregation module 116 aggregates event information stored in the event store 114 for transmission to the threat analytics system 120. The event aggregation module 116 operates under two main principles when aggregating event information: data security and storage efficiency. To achieve both, the event aggregation module 116 aggregates event information into a space-efficient and obfuscated data structure that can be searched in a time efficient manner. These data structures are referred to herein as the "aggregated event data structure." Examples of aggregated event data structures include a hashmap, a bitmap, a Bloom filter, key-value pairs, a list, raw data without processing, etc. In one embodiment, the event aggregation module 116 compares the event information against one or more whitelists to filter out events that have been previously determined to not be events related to a current or impending threat. The whitelists may be configurable and changed frequently depending on the threat information available to the aggregation module 116.

In one embodiment, the event aggregation module 116 aggregates the event information associated with a given time period, e.g., year, month, data, hour, into a Bloom filter, a type of an aggregated event data structure. In general, a Bloom filter is a space-efficient probabilistic data structure that is used to test whether a given element, such as a hash of an entity identifier, is included in the Bloom filter. Searching a Bloom filter may yield false positives but not false negatives. In operation, the event aggregation module 116 generates a Bloom filter associated with a given time period based on the entity identifiers associated with the events that occurred within the client system in the given time period. Importantly, the Bloom filter does not store the actual entity identifiers, and, instead, stores an obfuscated version, i.e., a hash of the entity identifiers. The Bloom filter may be a scalable counting Bloom filter such that the size of the Bloom filter can be increased as necessary. Once generated, for a given entity identifier, the Bloom filter can be searched to determine whether the entity identifier is for certain not included in the Bloom filter. Persons skilled in the art would readily recognize that event information may be aggregated in the same manner in data structures other than a Bloom filter.

The configuration store 118 stores configurations according to which the event aggregation module 116 aggregates event information. One such configuration is the frequency, e.g., daily, monthly, hourly, real-time, etc., with which the event information is aggregated into an aggregated event data structure. The event aggregation module 116 consequently generates aggregated event data structures at the time specified by the configuration. Another configuration is the time periods for which the event information is to be aggregated, e.g., aggregated event information for a year, aggregated event information for a month, etc. The event aggregation module 116 consequently generates aggregated event data structures for the various time periods specified in the configuration store 118. Other configurations may relate to the maximum size and error rate for the data structures, e.g., Bloom filters, generated by the event aggregation module 116. In one example, these configurations dictate the size and error rate requirements for the data structures, e.g., Bloom filters, generated by the event aggregation module 116. In one embodiment, the size and error rate requirements for Bloom filters vary depending on the time period associated with the Bloom filters. For example, a Bloom filter storing obfuscated event information for a given year may justifiably be larger and have a higher error rate than a Bloom filter storing obfuscated event information for a given month.

In one embodiment, during aggregation, the event aggregation module 116 periodically checkpoints the event information aggregated thus far for crash recovery purposes. Specifically, if the security monitoring system 110, as a whole, or the event aggregation module 116, specifically, suffers a crash during the aggregation process, then the event aggregation module 116 may recover from the last checkpoint as opposed to starting the aggregation process from the beginning.

The event aggregation module 116 transmits the generated aggregated event data structures to the threat analytics system 120 for threat detection purposes. In alternate embodiments, the event information is transmitted to the threat analytics system is as single events without being aggregated. The threat analytics system 120 includes an client interface engine 122, a threat detection engine 124, and a feed interface engine 126.

The client interface engine 122 provides a unified bi-directional communication interface that enables the threat analytics system 120 to communicate with the security monitoring systems 110. In particular, the client interface engine 122 receives aggregated event data structures from the security monitoring systems 110 and transmits those data structures to the threat detection engine 124. Importantly, the client interface engine 122 abstracts the various communication protocols across different security monitoring systems 110 such that other downstream components of the threat analytics system 120 operate without specific knowledge of the various protocols. The client interface engine 122 includes a one-to-many push communication feature that enables downstream components of the threat analytics system 120 to transmit a single communication to all the security monitoring systems 110. Further, for incoming communications from a security monitoring system 110, the client interface engine 122 checkpoints the communications such that, if the communication is disrupted for any reason, the security monitoring system 110 is not required to restart the communication from the beginning.

The feed interface engine 126 provides a communication interface that enables the threat analytics system 120 to receive threat data feeds from the threat data sources 130. A threat data feed includes a list of threat indicators that the threat data source 130 from which the feed was received has deemed as a threat. The feed interface engine 126 receives threat data feeds and transmits those feeds to the threat detection engine 124 for further processing.

The threat detection engine 124 provides at least three functions: (1) identify red flag events, i.e., events that are indicative of a cyber-threat, (2) provide detailed reports regarding red flag events to the relevant security monitoring system 110, and (3) analyze the quality of incoming threat data feeds. The operation of the threat detection engine 124 in performing at least these functions is described in detail below in conjunction with FIGS. 2-4.

Threat Detection Process

Figure 2:
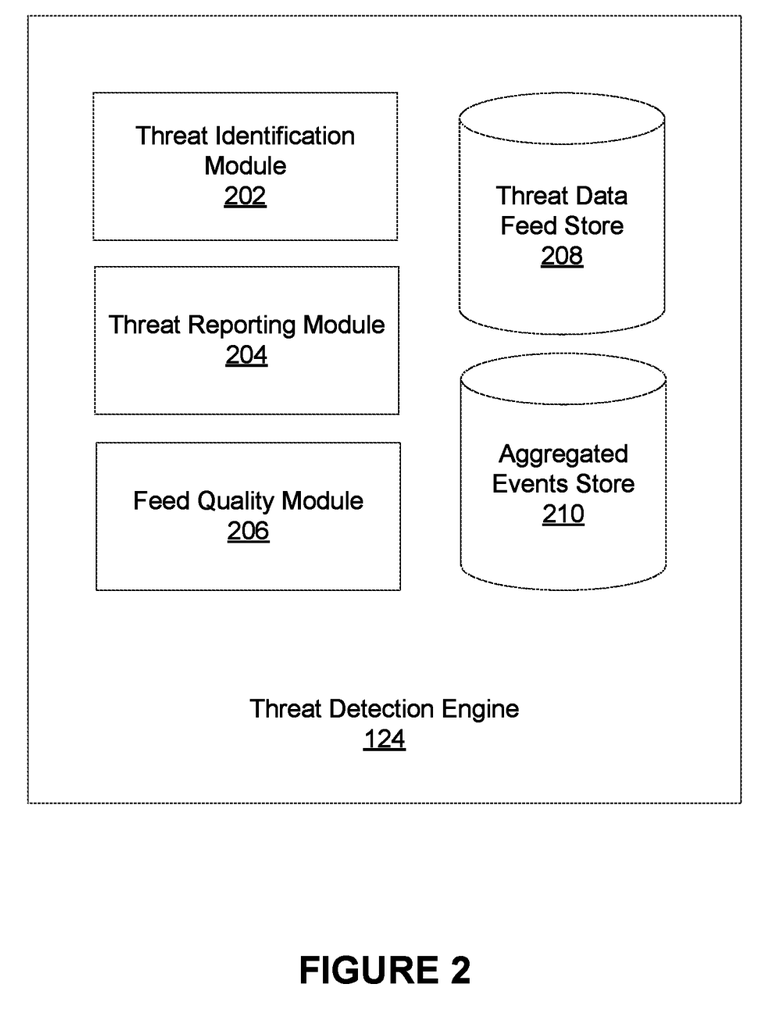
FIG. 2 illustrates a detailed diagram of the threat detection engine in FIG. 1.

FIG. 2 illustrates a detailed diagram of the threat detection engine 124 in FIG. 1. As shown, the threat detection engine 124 includes a threat identification module 202, a threat reporting module 204, a feed quality module 206, a threat data feed store 208, and an aggregated events store 210.

The threat data feed store 208 stores the threat data feeds received from the threat data sources 130 via the feed interface engine 126. In conjunction with each threat data feed, the threat data feed store 208 stores an identifier uniquely associated with the threat data source 130 from which the feed was received, the time that the feed was received, and a quality metric associated with the feed. The quality metric may be received from an independent source, may be computed by the threat detection engine 124 (as discussed below in conjunction with the feed quality module 206), or may be a combination of a metric received from an independent source and a metric computed by the threat detection engine 124.

The aggregated events store 210 stores the aggregated event data structures received from the security monitoring systems 110 via the client interface engine 122. In conjunction with each aggregated event data structure, the aggregated events store 210 stores an identifier uniquely associated with the security monitoring system 110 from which the data structure was received, the time that the data structure was received, and the time period for which the data structure was generated.

Figure 3:
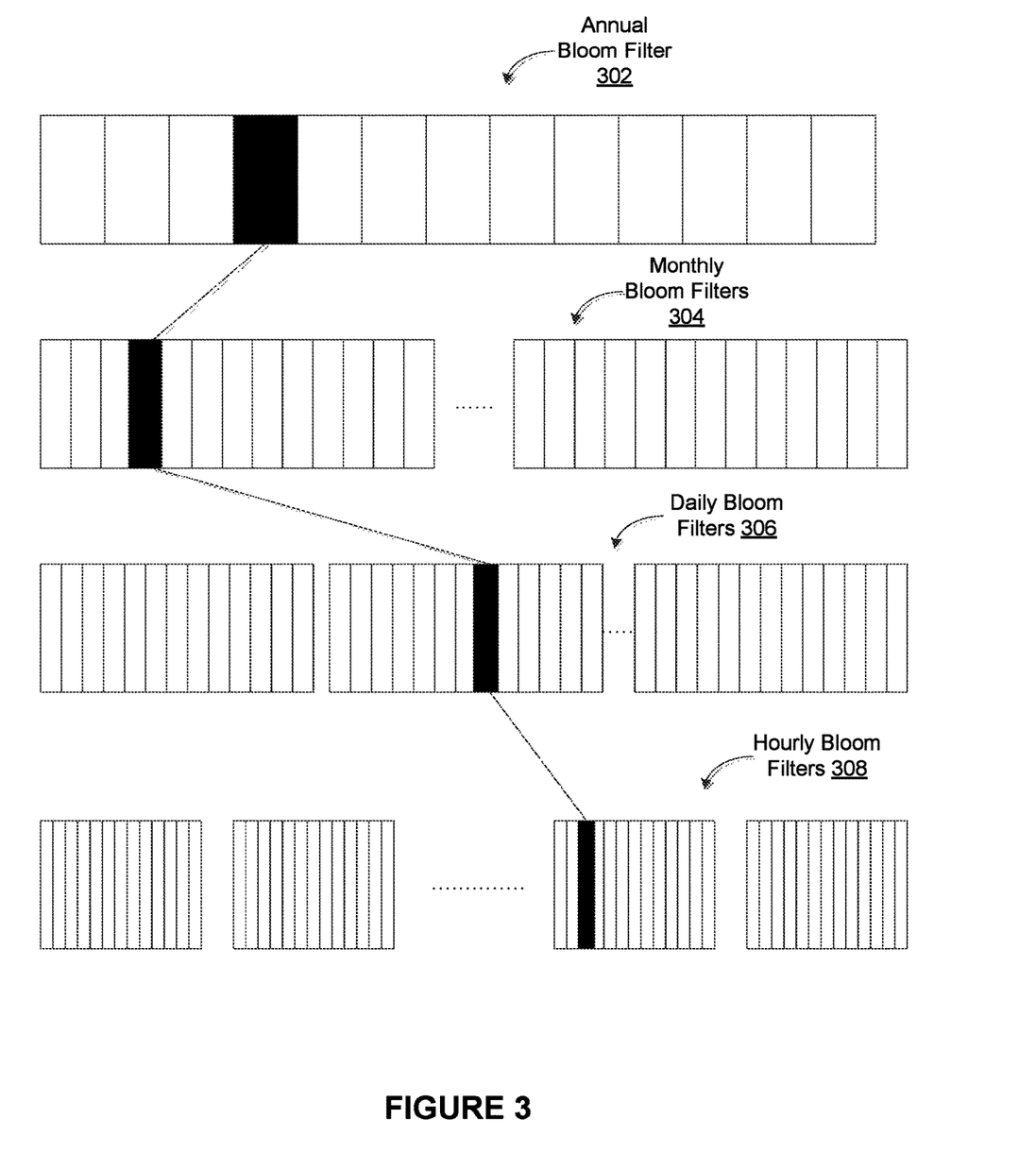
FIG. 3 illustrates a hierarchy of Bloom filters for storing aggregated event data received from a security monitoring system.

In one embodiment, the aggregated events store 210 stores aggregated event data structures received from a security monitoring system 110 in an indexed hierarchy. FIG. 3 illustrates a hierarchy of Bloom filters for storing aggregated event data received from a security monitoring system 110. As shown, each of the Bloom filters 302-308 has a different level of time-based granularity. For example, the annual Bloom filter 302 is associated with a given year, the monthly Bloom filters 304 are each associated with a difference month of the given year, the daily Bloom filters 306 are each associated with a different day of a month, and the hourly Bloom filters 308 are each associated with a different hour of the day. Persons skilled in the art would recognize that other types of data structures may be organized to the same type of hierarchy illustrated for Bloom filters in FIG. 3.

Turning back to FIG. 2, the threat identification module 202 processes the aggregated event data structures to identify red flag events, i.e., events that were captured at the security monitoring systems 110 and are indicative of a cyber-threat. To identify red flag events, the threat identification module 202 searches the aggregated event data structures associated with a particular security monitoring system 110 for a match between entity identifiers represented by the data structure and the threat indicators included in the threat data feeds stored in the store 208.

In one embodiment, the threat identification module 202 expands the available threat indicators in the store 208 via one or more indicator expansion techniques. An indicator expansion technique allows the threat identification module 202 to evaluate one or more parameters of a threat indicator and generate additional indicators based on the parameters. For example, for a threat indicator that includes an internet protocol address, the threat identification module 202 may determine the domain of the address. Based on the domain, the threat identification module 202 then determines other IP addresses that were previously associated with that domain. The additional IP addresses then also become threat indicators, and, more specifically, expanded threat indicators.

In another example, for a threat indicator that includes an email address, the threat identification module 202 may determine a domain that is registered using the email address based on domain registrant information. The domain then also becomes a threat indicator. In another example, the threat identification module 202 may analyze log information provided by the security monitoring systems 110 to identify additional threat indicators based on internet protocol addresses, email addresses, domains, or other information associated with threats or attacks experienced by the systems 110. The threat identification module 202 stores the expanded threat indicators in the store 208 in conjunction with the threat indicators received directly from the threat data feeds. The threat identification module 202 additionally uses these expanded threat indicators when identifying red flag events.

In the embodiment where the data structure is a Bloom filter, the threat identification module 202 determines whether each threat indicator is not present in the Bloom filter. If an indicator is not present, then the events represented by the Bloom filter are not associated with the threat indicated by the threat indicator. If an indicator is present (and this may be a false positive in the case of a Bloom filter), then at least one event represented by the Bloom filter is associated with the threat indicated by the threat indicator. In one embodiment, where the Bloom filters received from a security monitoring system 110 are organized as a time-based hierarchy (as shown in FIG. 3), the threat identification module 202 may first determine whether a given indicator is present in the Bloom filter associated with the lowest granularity (e.g., annual Bloom filter) and only then progress to Bloom filters associated with higher granularities (e.g., monthly). This hierarchical searching is time efficient such that only the necessary Bloom filters are searched. Persons skilled in the art would recognize that Bloom filters may be replaced with other types of event data structures include a hashmap, a bitmap, a Bloom filter, key-value pairs, a list, raw data without processing, etc When an event is determined to be associated with a given threat indicator, the threat identification module 202 may optionally investigate the validity of the threat associated with the threat indicator. In some cases, the threat feeds that include the threat indicators are not fully accurate. Therefore, the additional investigation into the validity of the threat reduces the likelihood of false reporting of threats to the security monitoring systems 110. In some embodiments, the threat identification module 202 initiates a manual process for performing such an evaluation. In some embodiments, the threat identification module 202 is configured with automated processes for evaluating the validity of the threat. In one example, the threat identification module 202 computes a threat confidence score for each threat that indicates a numerical confidence of the validity of the threat. Such a confidence score may be computed using machine learning algorithms that take into account features related to the threat indicator itself and the threat feed as a whole. Examples of threat indicator features include who is information, domain name space, and virus total information associated with the threat. In some embodiments, the threat confidence score computed by the threat identification module 202 may be manually overridden by an administrator or other user of the threat analytics system 120. Importantly, threats that are determined to be invalid are flagged as invalid threats in the threat data feeds stored in the store 208. Therefore, the threat data feeds become increasingly accurate over time.

An event that is attributed to the entity identifier matching the threat indicator is deemed a red flag event. The threat reporting module 204 reports the existence of the red flag event to the requisite security monitoring system 110 that collected the event information. The threat reporting module 204 supports various types of reporting mechanisms including individual alerts when a red flag event is identified and time-based (e.g., hourly, weekly, and monthly) reports of all identified red flag events.

In one embodiment, the threat identification module 202 identifies red flag events that are attributed to domains generated by domain generation algorithms. A domain generation algorithm is used by malicious entities to periodically generate a large number of domain names that are linked to the malicious entities' systems. The large number of domain names makes it difficult to track and pre-identify these domains as malicious. To address such scenarios, the threat identification module 202 determines whether a domain associated with a given event is indicative of a cyber-threat by analyzing the domain name. The domain name analysis may be based on rules such as whether the length of the domain name exceeds a threshold, whether the domain name includes dictionary words, whether the domain name includes repeated characters, etc. These rules may be determined using machine learning.

Figure 4:
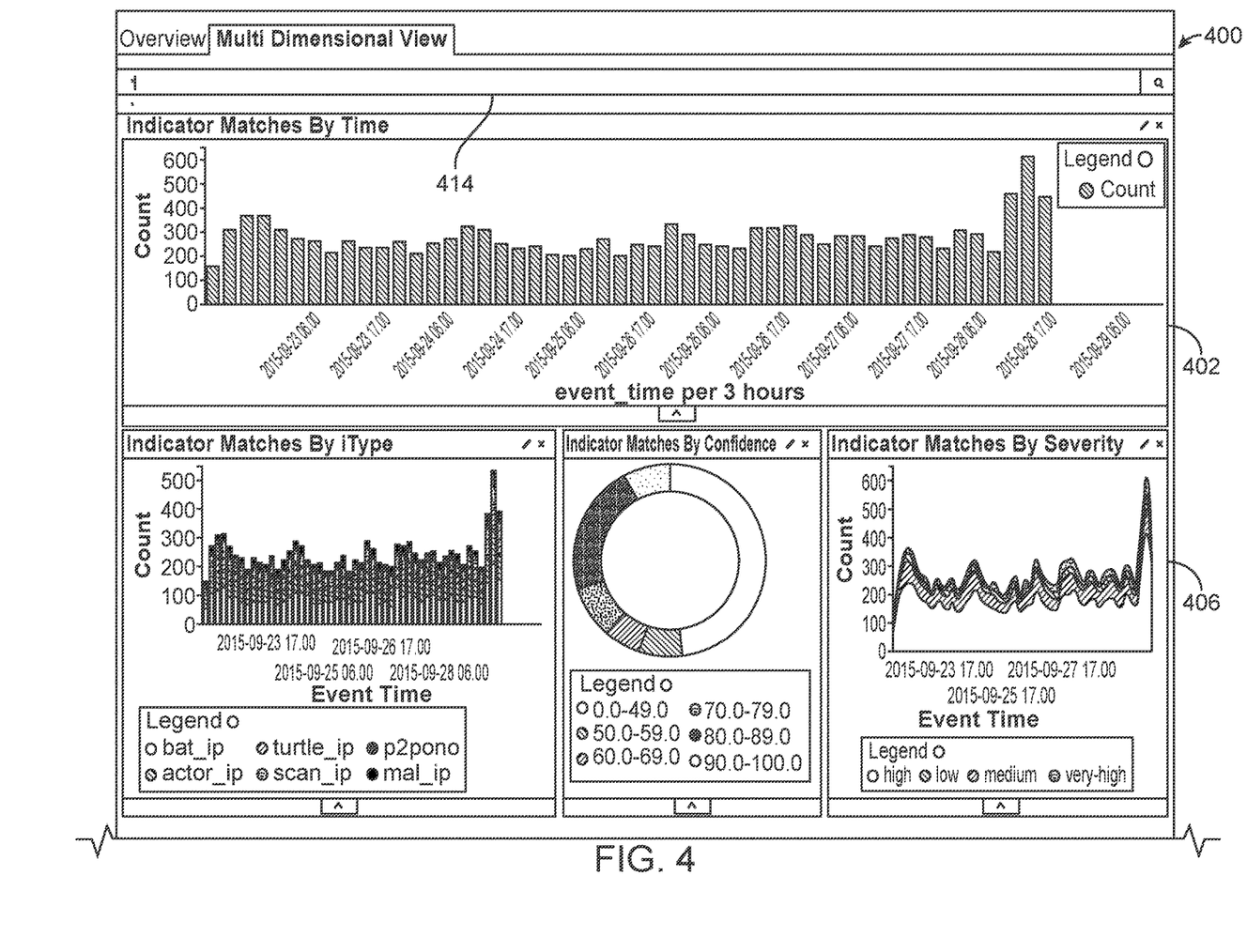
FIG. 4 illustrates an exemplary threat reporting interface generated by the threat reporting module for a given security monitoring system.

FIG. 4 illustrates an exemplary threat reporting interface 400 generated by the threat reporting module 204 for a given security monitoring system 110. The threat reporting interface 400 presents a multidimensional interactive display of threat data, such as red flag events, identified for the given security monitoring system 110.

The threat reporting interface 400 includes multiple panels, such as panels 402-412. Each panel displays threat data organized according to a particular dimension. The different dimensions according to which a panel may be generated include time of the threats (as in panel 402), types of threats, confidence of the threats being valid, severity of the threats (as in panel 406), the type of threatening action (panel 412), destination and source ports, tags, and geography. In one embodiment, the threat reporting interface 400 concurrently displays the different panels shown in FIG. 4 on the same display interface. In alternate embodiments, the threat reporting interface 400 generates different interfaces for individual panels or groups of panels.

In one embodiment, the threat reporting module 204 generates a threat map panel 410 for a given security monitoring system 110 based on the red flag events identified for the security monitoring system 110. The threat map panel 410 visually indicates the various locations on the Earth from associated with the red flag events. Such a location may be determined based on the event information collected for the red flag event and/or the information included in the threat data feed for the threat indicator.

In one embodiment, the threat reporting interface 400 and the individual panels included therein are interactive. For example, a user to whom the reporting interface 400 is displayed may select a portion of a panel and zoom into the threat data in that portion to view additional details and/or a more detailed breakdown of the threat data. Further, the individual panels in the threat reporting interface 400 may be linked such that, if a user interaction causes an update to a given panel, then one or more other panels may be similarly updated. For example, if the panel showing threat data by time zooms into a given time period, then one or more other panels similarly update to only show the threat data that was captured in the given time period. In one embodiment, the threat reporting interface 400 is touch-sensitive such that a user may interact with and manipulate the interface 400 and the panels therein using touch input.

The threat reporting interface 400 also enables users to provide textual queries in the query input 414 to filter threat data presented in the interface 400 according to different categories. Such categories include inbound/outbound threats, allowed/denied threats, threat severity, threat type, time, destination/source, etc. In operation, when a user enters a textual query, the threat reporting module 204 parses the text of the query to determine the filtering parameters specified in the query. Each filtering parameter indicates a category according to which the threat data should be filtered and optionally includes a range of values that would satisfy the filtering parameter. The threat reporting module 204 processes the threat data for the given security monitoring system 110 according to the determined filtering parameters. The threat reporting module 204 presents the resulting filtered threat data in the threat reporting interface 400.

Turning back to FIG. 2, alongside real-time (or close to real-time) threat detection, the threat identification module 202 may also perform a historical analysis on the aggregated event data structures stored in the store 210 and associated with a given security monitoring system 110. For example, if an indicator that was not previously identified as a threat is now identified as a threat, then the identification module 202 may evaluate historical events in the aggregated event data structures to determine whether the security monitoring system 110 experienced the threat.

Further, organizing aggregated event data structures in a time-based hierarchy, as shown in FIG. 3 for example, allows for efficiently performing forensics operations in situations where a new threat is identified. The forensics operations powered by the aggregated event data structures enable entities to investigate in real-time threats experienced by one or more security monitoring systems 110. In operation, the threat detection engine 124 receives a forensics search query that specifies one or more parameters for searching for threats based on historical data available in the aggregated event data structures as well as threat indicators stored in the store 208. The threat detection engine 124 performs a real-time search operation using the hierarchical indices of the data structures to identify events that match the search query. The threat detection engine 124 presents the search results in an interactive interface.

In one embodiment, the forensics search query specifies one or more parameters for expanding available threat indicators and thus generating additional threat indicators to be considered as part of the forensics operation. The expansion may be executed on particular threat indicators or groups of threat indicators that match other aspects of the forensics search query.

Figure 5:
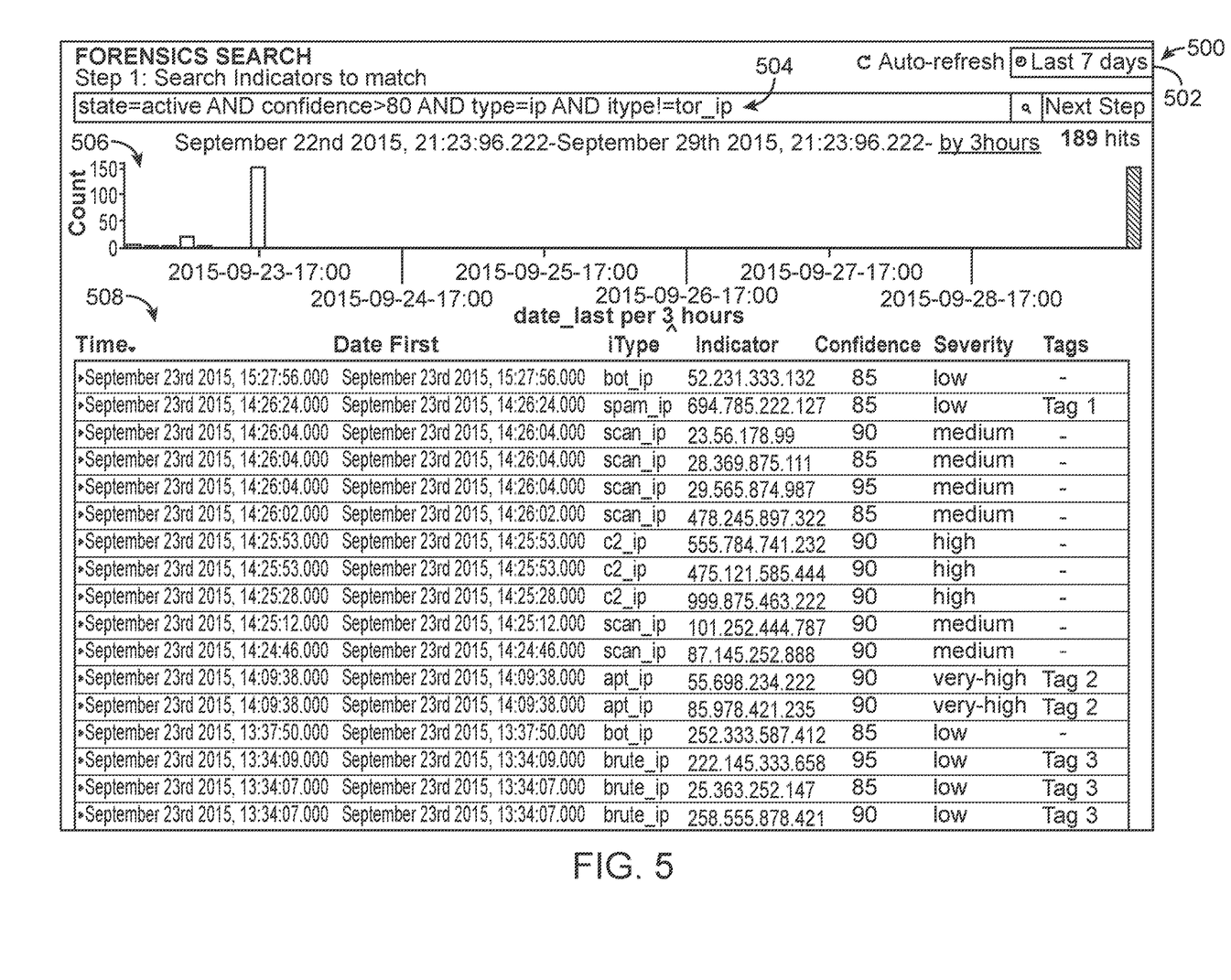
FIG. 5 illustrates an exemplary forensics interface generated by the threat detection engine.

FIG. 5 illustrates an exemplary forensics interface 500 generated by the threat detection engine 124. The interface 500 includes a duration selection element 502 that enables a user of the interface 500 to select the duration of threat data being evaluated. The interface 500 also includes a query input 504 that enables the user to provide textual forensics search queries for performing forensics operations.

The interface 500 presents the results of the search query in the graph element 506 and the table element 508. The graph element 506 shows a count of events that match the search query plotted on a time axis. The table element 508 shows details of each of the events that match the search query. The details for each event include the time the event occurred, the type of threat, the internet protocol address associated with the treat, a confidence level that the threat is real, a severity level of the threat, and any metadata, such as tags, associated with the threat. In one embodiment, the interface 500 visually highlights certain details to catch the user's attention. For example, an event having a high severity level may be highlighted or colored in a different color relative to other events.

The feed quality module 206 periodically computes a quality metric associated with each threat data feed received from the threat data sources 130. In operation, for a given data feed, the feed quality module 206 determines the number of threat indicators that were deemed to be invalid over time. The quality metric is a numerical representation of at least the number of invalid threat indicators. In one embodiment, the feed quality module 206 may also generate a relevance index for each security monitoring system 110. For a given security monitoring system 110, when a red flag event is identified using a given threat indicator, the threat analytics system 120 re-computes the relevance index for that type of threat indicator to signify that such threats are relevant to the security monitoring system 110. The relevance index of a threat feed or a type of threat indicator for a given security monitoring system 110 indicates how relevant the feed or the type of threat is for the system 110. The feed quality module 206 stores the quality metric computed for a threat data feed and the relevance indices computed the security monitoring system 110 in the threat data feed store 208.

The quality metric and relevance indices may be used in several ways. For example, the quality metrics of threat data feeds received from a given threat data source 130 may be used to make future purchasing decisions from the threat data source 130. Specifically, if the average quality metrics of the data feeds received from the threat data source 130 falls below a minimum threshold, then the price paid for a future data feed may be capped at a maximum amount or the data feed may not be purchased at all. As another example, during the threat detection process, the threat identification module 202 may determine the quality metric of the threat data feed that has yielded a match with an event that was captured by a security monitoring system 110. When the quality metric indicates a low quality, the threat identification module 202 may perform a more stringent threat validation process as opposed to when the quality metric indicates a higher quality.

In one embodiment, the threat detection engine 124 provides customers with a digital store to purchase threat data feeds. In the digital store, the threat detection engine 124 may sort threat data feeds according to the relative quality metrics. The threat detection engine 124 may alternatively or additionally present threat data feeds according to the relevance indices computed for that particular customer (such as a security monitoring system 110). In one embodiment, the threat detection engine 124 enables customers to compare two or more threat data feeds according to their relevance indices and the size of the indicator overlap (if any). Indicator overlap occurs when two or more threat data feeds include the at least some common threat indicators thus having some overlap.

Figure 6:
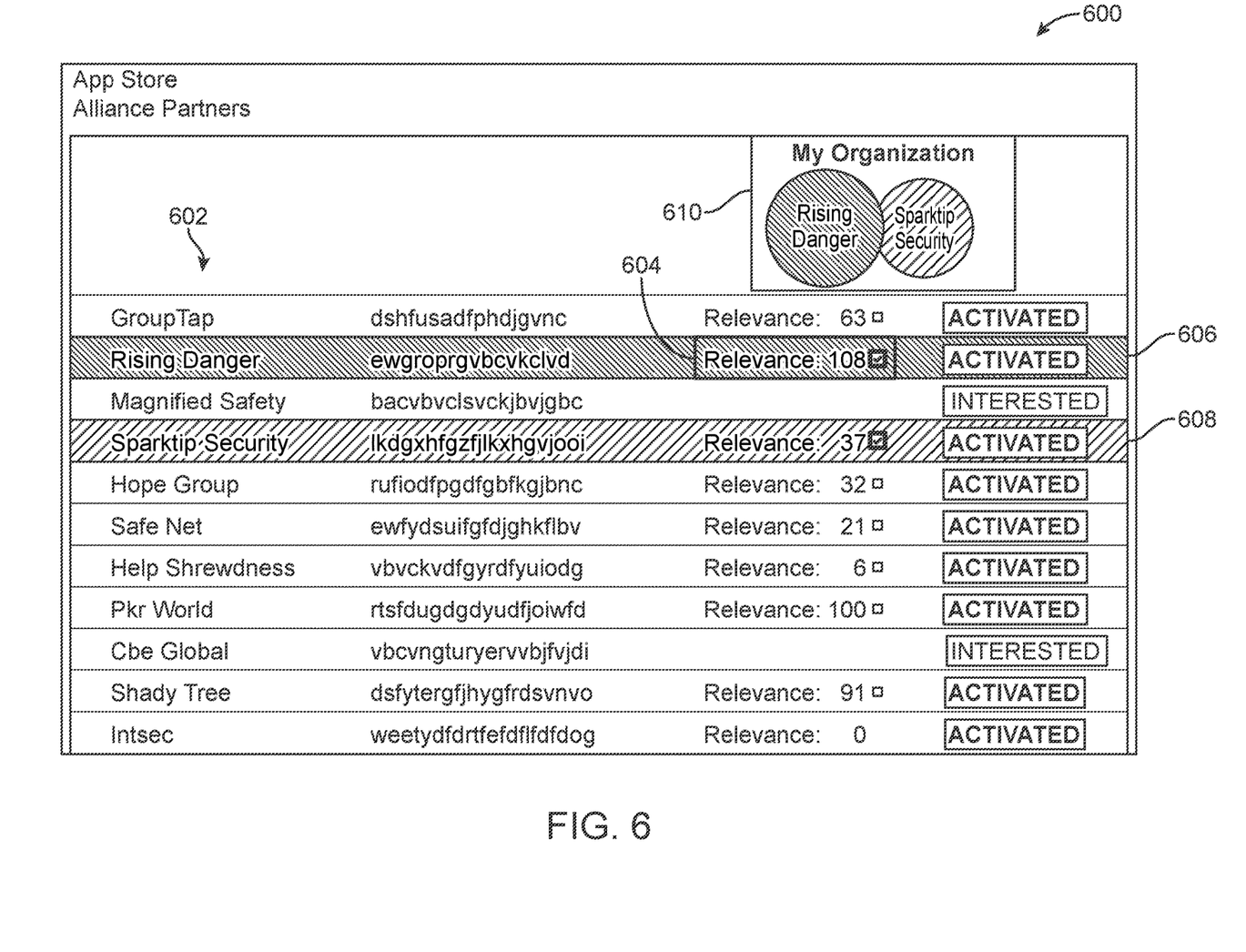
FIG. 6 illustrates an exemplary store interface generated by the threat detection engine.

FIG. 6 illustrates an exemplary store interface 600 generated by the threat detection engine 124. As shown, the store interface 600 includes a list 602 of threat data feeds including feeds 606 and 608. For each feed, the store interface 600 presents the name of the feed, the source of the feed, and a relevance score computed for the feed. For example, relevance score 604 is computed for feed 606. The store interface 600 also enables an end-user to compare two or more feeds to determine how much indicator overlap exists among the feeds. In the exemplary illustration shown, the user has selected feed 606 and 608 for comparison. The store interface 600 displays an overlap element 610 that visually represents the amount of indicator overlap that exists among the feeds 606 and 608.

Figure 7:
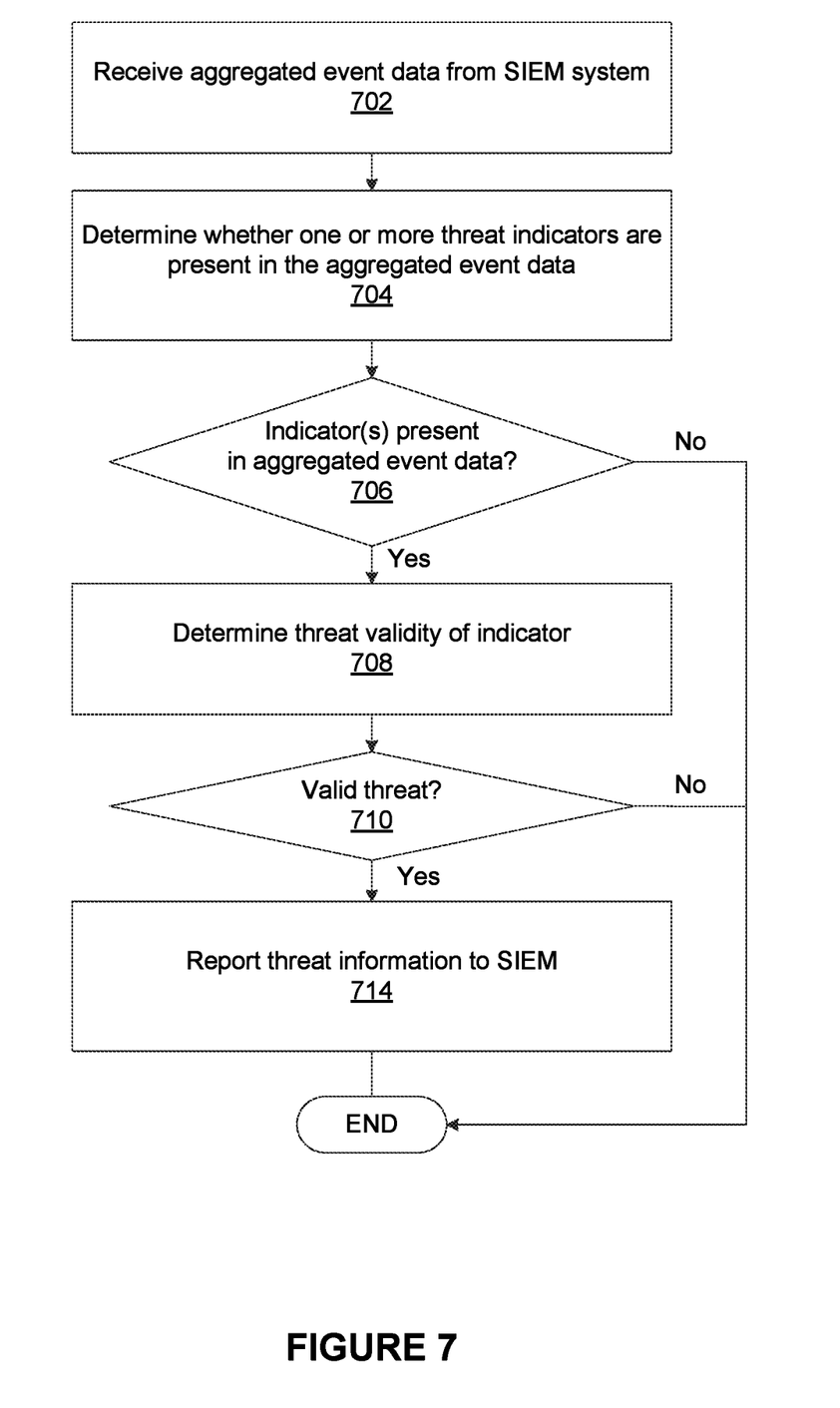
FIG. 7 illustrates an example flow diagram for detecting a threat based on aggregated event data received from a security monitoring system.

FIG. 7 illustrates an example flow diagram for detecting a threat based on aggregated event data received from a security monitoring system 110. Other embodiments may perform the steps of the process illustrated in FIG. 7 in different orders and can include different, additional and/or fewer steps. The process may be performed by any suitable entity, such as the threat detection engine 124.

The threat detection engine 124 receives 702 aggregated event data from a security monitoring system 110 via a client interface engine 122. The aggregated event data includes information associated with events that were collected by the security monitoring system 110 in a given time period. Each event is associated with at least a timestamp and an entity identifier to which the event can be attributed. In one embodiment, the aggregated event data is organized into a space efficient data structure, e.g., a Bloom filter, and may be obfuscated.

The threat detection engine 124 determines 704 whether one or more threat indicators stored in the threat data feed store 208 are presented in the aggregated event data. Specifically, the threat detection engine 124 compares the aggregated event data with the threat indicators included in the threat data feed to determine whether a threat indicator is present in the event data. If a threat indicator is not present in the aggregated event data, then the threat detection engine 124 does not proceed 706 any further. If, however, a threat indicator is present in the aggregated event data, then the threat detection engine 124 proceeds 706 to step 708.

The threat detection engine 124 determines 708 determines the validity of the threat associated with the threat indicator that is present in the aggregated event data. In some embodiments, the threat identification module 202 is configured with automated procedures for evaluating the validity of the threat. In other embodiments, the threat identification module 202 initiates a manual process for performing such an evaluation. If the threat associated with the threat indicator is determined to be invalid, then the threat detection engine 124 does not proceed 710 any further. If, however, the threat associated with the threat indicator is determined to be valid, then the threat detection engine 124 proceeds 710 to step 712.

If a threat is determined to be valid, an event that is attributed to the entity identifier that matches the threat indicator is deemed a red flag event. The threat detection engine 124 reports 714 the existence of the red flag event and corresponding threat information to the requisite security monitoring system 110 that collected the event information. The threat reporting module 204 supports various types of reporting mechanisms including individual alerts when an red flag event is identified and time-based (e.g., hourly, weekly, and monthly) reports of all identified red flag events.

Example Computer System

Figure 8:
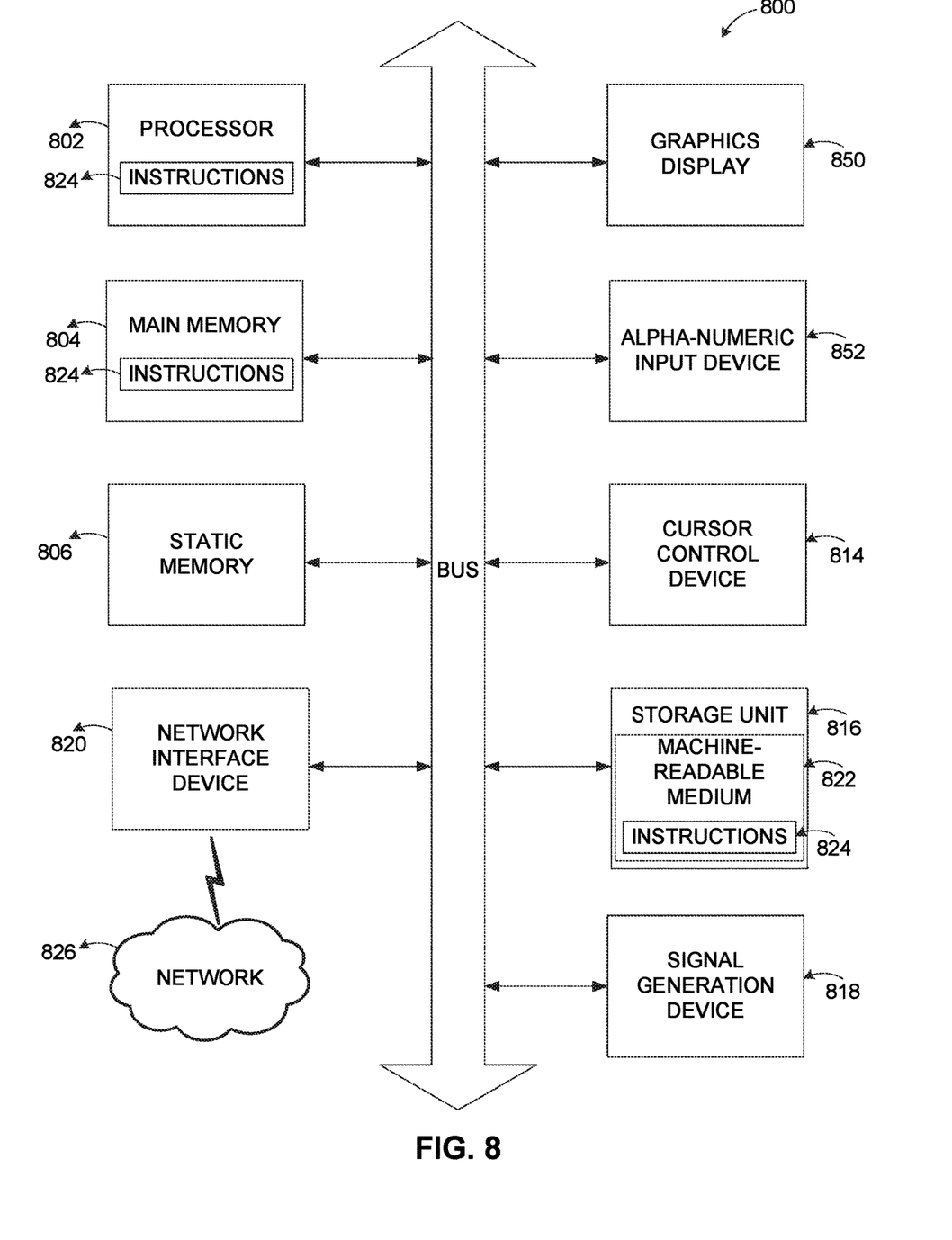
FIG. 8 is a block diagram illustrating components of an example machine configured to read instructions from a machine-readable medium and execute the instructions in a processor (or controller).

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804 and the storage unit 816 communicate via a bus 808.

In addition, the computer system 806 can include a static memory 806, a display driver 850 (e.g., to drive a plasma display panel (PDP), a liquid crystal display (LCD), or a projector). The computer system 800 may also include alphanumeric input device 852 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for threat detection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for performing threat detection, comprising:
receiving, at a server, aggregated event data from a client system, the aggregated event data comprising a plurality of event data structures, each event data structure of the plurality of event data structures comprising event data received during a different level of time-based granularity, the aggregated event data including an obfuscated representation of entity identifiers associated with each of a plurality of different events occurring on the client system during each different level of time-based granularity and excluding the entity identifiers themselves;
in response to receiving the aggregated event data, determining, at the server, a subset of the aggregated event data in an event data structure of the plurality of event data structures having a lowest level of granularity comprising a plurality of event data that is associated with at least one cyber-threat; and
reporting a message, by the server, indicating the presence of the at least one cyber-threat for each of the plurality of event data of the subset to the client system.

2. The method of claim 1, wherein determining that the event data is associated with the at least one cyber-threat comprises determining whether a domain name associated with the event data is affiliated with a malicious entity.

3. The method of claim 1, wherein determining that the event data is associated with the at least one cyber-threat comprises comparing the event data with one or more threat indicators to determine whether at least one threat indicator of a plurality of known threat indicators is present in the event data, each threat indicator of the plurality of known threat indicators associated with at least one potential cyber-threat.

4. The method of claim 3, wherein the event data comprises an indexed hierarchy of events, a first level in the indexed hierarchy associated with a different time-based granularity relative to a second level in the indexed hierarchy.

5. The method of claim 4, wherein comparing the event data with the one or more threat indicators comprises comparing the first level in the indexed hierarchy with the one or more threat indicators and proceeding to the second level in response to determining, based on the comparing of the first level with the one or more threat indicators, that a match exists between the first level and at least one of the one or more threat indicators.

6. The method of claim 3, further comprising:
identifying an additional threat indicator not included in the one or more threat indicators; and
performing one or more real-time forensics operations on the event data to determine whether a cyber-threat associated with the additional threat indicator is present in the event data.

7. The method of claim 3, further comprising generating a second threat indicator from a first threat indicator based on data extracted from the first threat indicator, the second threat indicator included in the one or more threat indicators.

8. The method of claim 1, further comprising receiving a textual search query specifying one or more parameters for filtering threat data, and updating a multi-panel display to present the threat data filtered according to the one or more parameters.

9. The method of claim 1, further comprising receiving a plurality of threat data feeds from threat data sources that include at least one of the one or more threat indicators.

10. The method of claim 9, further comprising computing a relevance index associated with each of the plurality of threat data feeds, the relevance index for a given threat data feed indicating how relevant threat indicators included in the threat data feed are to the client system.

11. A non-transitory computer readable medium storing instructions that, when executed by a processor of a server, cause the processor to:
receive, at a server, aggregated event data from a client system, the aggregated event data comprising a plurality of event data structures, each event data structure of the plurality of event data structures comprising event data received during a different level of time-based granularity, the aggregated event data including an obfuscated representation of entity identifiers associated with each of a plurality of different events occurring on the client system during each different level of time-based granularity and excluding the entity identifiers themselves;
in response to receiving the aggregated event data, determine, at the server, a subset of the aggregated event data in an event data structure of the plurality of event data structures having a lowest level of granularity comprising a plurality of event data that is associated with at least one cyber-threat; and
report a message, by the server, indicating the presence of the at least one cyber-threat for each of the plurality of event data of the subset to the client system.

12. The non-transitory computer readable medium of claim 11, wherein determining that the event data is associated with the at least one cyber-threat comprises determining whether a domain name associated with the event data is affiliated with a malicious entity.

13. The non-transitory computer readable medium of claim 11, wherein determining that the event data is associated with the at least one cyber-threat comprises comparing the event data with one or more threat indicators to determine whether at least one threat indicator of a plurality of known threat indicators is present in the event data, each threat indicator of the plurality of known threat indicators associated with at least one potential cyber-threat.

14. The non-transitory computer readable medium of claim 13, wherein the event data comprises an indexed hierarchy of events, a first level in the indexed hierarchy associated with a different time-based granularity relative to a second level in the indexed hierarchy.

15. The non-transitory computer readable medium of claim 14, wherein comparing the event data with the one or more threat indicators comprises comparing the first level in the indexed hierarchy with the one or more threat indicators and proceeding to the second level in response to determining, based on the comparing of the first level with the one or more threat indicators, that a match exists between the first level and at least one of the one or more threat indicators.

16. The non-transitory computer readable medium of claim 13, wherein the instructions, when executed by the processor of the server, further cause the processor to:
identify an additional threat indicator not included in the one or more threat indicators; and
perform one or more real-time forensics operations on the event data to determine whether a cyber-threat associated with the additional threat indicator is present in the event data.

17. The non-transitory computer readable medium of claim 13, wherein the instructions, when executed by the processor of the server, further cause the processor to generate a second threat indicator from a first threat indicator based on data extracted from the first threat indicator, the second threat indicator included in the one or more threat indicators.

18. The non-transitory computer readable medium of claim 11, wherein the instructions, when executed by the processor of the server, further cause the processor to receive a textual search query specifying one or more parameters for filtering threat data, and update a multi-panel display to present the threat data filtered according to the one or more parameters.

19. The non-transitory computer readable medium of claim 11, wherein the instructions, when executed by the processor of the server, further cause the processor to receive a plurality of threat data feeds from threat data sources that include at least one of the one or more threat indicators.

20. The non-transitory computer readable medium of claim 19, wherein the instructions, when executed by the processor of the server, further cause the processor to compute a relevance index associated with each of the plurality of threat data feeds, the relevance index for a given threat data feed indicating how relevant threat indicators included in the threat data feed are to the client system.

* * * * *